(12) United States Patent
Yuan et al.

(10) Patent No.: US 11,093,733 B2
(45) Date of Patent: Aug. 17, 2021

(54) IMAGE PROCESSING METHOD AND APPARATUS, STORAGE MEDIUM AND ELECTRONIC DEVICE

(71) Applicant: NETEASE (HANGZHOU) NETWORK CO., LTD., Zhejiang (CN)

(72) Inventors: Yi Yuan, Zhejiang (CN); Tianyang Shi, Zhejiang (CN); Changjie Fan, Zhejiang (CN)

(73) Assignee: NETEASE (HANGZHOU) NETWORK CO., LTD., Hangzhou (CN)

(*) Notice: Subject to any disclaimer, the term of this patent is extended or adjusted under 35 U.S.C. 154(b) by 15 days.

(21) Appl. No.: 16/716,532

(22) Filed: Dec. 17, 2019

(65) Prior Publication Data

US 2020/0202111 A1    Jun. 25, 2020

(30) Foreign Application Priority Data

Dec. 19, 2018  (CN) .......................... 201811556498.4

(51) Int. Cl.
*G06K 9/00* (2006.01)

(52) U.S. Cl.
CPC ..... *G06K 9/00281* (2013.01); *G06K 9/00248* (2013.01); *G06K 9/00261* (2013.01); *G06K 9/00315* (2013.01)

(58) Field of Classification Search
CPC ........... G06K 9/00281; G06K 9/00248; G06K 9/00261; G06K 9/00315; G06K 9/6273;

(Continued)

(56) References Cited

U.S. PATENT DOCUMENTS 10,636,221 B2 *  4/2020  Li .......................... G06F 3/0484
2009/0252435 A1 * 10/2009  Wen ..................... G06K 9/6257
                                                      382/284

(Continued)

FOREIGN PATENT DOCUMENTS

| CN | 104637035 A | 5/2015 |
| CN | 108510437 A | 9/2018 |
| CN | 108876891 A | 11/2018 |

OTHER PUBLICATIONS

Corresponding CN application sesarch report.

*Primary Examiner* — Phuoc Tran
(74) *Attorney, Agent, or Firm* — Gang Yu

(57) ABSTRACT

An image processing method and apparatus, a storage medium and an electronic device are disclosed. The method comprises: acquiring a first face image in a real scene and a second face image in a virtual scene, wherein the second face image is generated at least according to a first value of at least one target parameter, and the at least one target parameter is used for determining at least one attribute of a face image in the virtual scene; extracting at least one first image feature from the first face image, and extracting at least one second image feature from the second face image; acquiring a similarity between the at least one first image feature and the at least one second image feature; adjusting the first value of the at least one target parameter based on the similarity to obtain a target value of the at least one target parameter; and rendering the at least one target parameter according to the target value to obtain the target face image in the virtual scene.

19 Claims, 6 Drawing Sheets

(58) Field of Classification Search
CPC . G06K 9/00671; G06K 9/00288; G06T 13/40
See application file for complete search history.

(56) References Cited

U.S. PATENT DOCUMENTS

2017/0083754 A1    3/2017  Tang et al.
2020/0368616 A1*  11/2020  Delamont .............. A63F 13/25

* cited by examiner

IMAGE PROCESSING METHOD AND APPARATUS, STORAGE MEDIUM AND ELECTRONIC DEVICE

CROSS-REFERENCE TO RELATED APPLICATIONS

The present application claims benefit of Chinese Patent Priority No. 201811556498.4, filed to the China Patent Office on Dec. 19, 2018, entitled "Image Processing Method and Apparatus, Storage Medium and Electronic Device", the contents of which are hereby incorporated by reference in its entirety.

TECHNICAL FIELD

The present disclosure relates to the field of image processing, and in particular, to an image processing method and apparatus, a storage medium and an electronic device.

BACKGROUND

At present, image style transfer may be performed in image processing. The input of a style transfer model may be a content image and a style image, and the output is a combination thereof.

The above method may transform the overall style of the content image into a specified style. However, in response to the style of a face image is transformed to the style of a virtual character, the style transfer model often can only obtain result that is similar in overall color, but for hair, eyes, nose, and other parts, they cannot be transformed to such shape in a game. Therefore, there is a problem of low-level simulation in transformation from an input face image to a face image in a virtual scene.

SUMMARY

A main object of the present disclosure is to provide an image processing method and apparatus, a storage medium and an electronic device.

To achieve the above object, according to one aspect of the present disclosure, an image processing method is provided. The method may comprise: a first face image in a real scene and a second face image in a virtual scene are acquired, wherein the second face image is generated at least according to a first value of at least one target parameter, and the at least one target parameter is used for determining at least one attribute of a face image in the virtual scene; at least one at least one first image feature is extracted from the first face image, and at least one second image feature is extracted from the second face image; a similarity between the at least one first image feature and the at least one second image feature is acquired; the first value of the at least one target parameter is adjusted based on the similarity to obtain a target value of the at least one target parameter, wherein the target value is used for determining a target face image to be generated in the virtual scene, and a similarity between the target face image and the first face image is greater than or equal to a target threshold; and the at least one target parameter is rendered according to the target value to obtain the target face image in the virtual scene.

To achieve the above object, according to another aspect of the present disclosure, an image processing apparatus is provided. The apparatus may comprise: a first acquisition component, configured to acquire a first face image in a real scene and a second face image in a virtual scene, wherein the second face image is generated at least according to a first value of at least one target parameter, and the at least one target parameter is used for determining at least one attribute of a face image in the virtual scene; an extraction component, configured to extract at least one first image feature from the first face image, and extract at least one second image feature from the second face image; a second acquisition component, configured to acquire a similarity between the at least one first image feature and the at least one second image feature; an adjustment component, configured to adjust the first value of the at least one target parameter based on the similarity to obtain a target value of the at least one target parameter, wherein the target value is used for determining a target face image to be generated in the virtual scene, and a similarity between the target face image and the first face image is greater than or equal to a target threshold; and a rendering component, configured to render the at least one target parameter according to the target value to obtain the target face image in the virtual scene.

To achieve the above object, according to another aspect of the present disclosure, a non-transitory storage medium is provided, wherein the storage medium stores a computer program that is run to perform the following method: a first face image in a real scene and a second face image in a virtual scene are acquired, wherein the second face image is generated at least according to a first value of at least one target parameter, and the at least one target parameter is used for determining at least one attribute of a face image in the virtual scene; at least one first image feature is extracted from the first face image, and at least one second image feature is extracted from the second face image; a similarity between the at least one first image feature and the at least one second image feature is acquired; the first value of the at least one target parameter is adjusted based on the similarity to obtain a target value of the at least one target parameter, wherein the target value is used for determining a target face image to be generated in the virtual scene, and a similarity between the target face image and the first face image is greater than or equal to a target threshold; and the at least one target parameter is rendered according to the target value to obtain the target face image in the virtual scene.

To achieve the above object, according to another aspect of the present disclosure, an electronic device is provided. The electronic device may comprise a memory and a processor, wherein the memory stores a computer program, and the processor is configured to run the computer program to perform the following method: a first face image in a real scene and a second face image in a virtual scene are acquired, wherein the second face image is generated at least according to a first value of at least one target parameter, and the at least one target parameter is used for determining at least one attribute of a face image in the virtual scene; at least one first image feature is extracted from the first face image, and at least one second image feature is extracted from the second face image; a similarity between the at least one first image feature and the at least one second image feature is acquired; the first value of the at least one target parameter is adjusted based on the similarity to obtain a target value of the at least one target parameter, wherein the target value is used for determining a target face image to be generated in the virtual scene, and a similarity between the target face image and the first face image is greater than or equal to a target threshold; and the at least one target parameter is rendered according to the target value to obtain the target face image in the virtual scene.

DETAILED DESCRIPTION OF THE EMBODIMENTS

Figure 1:
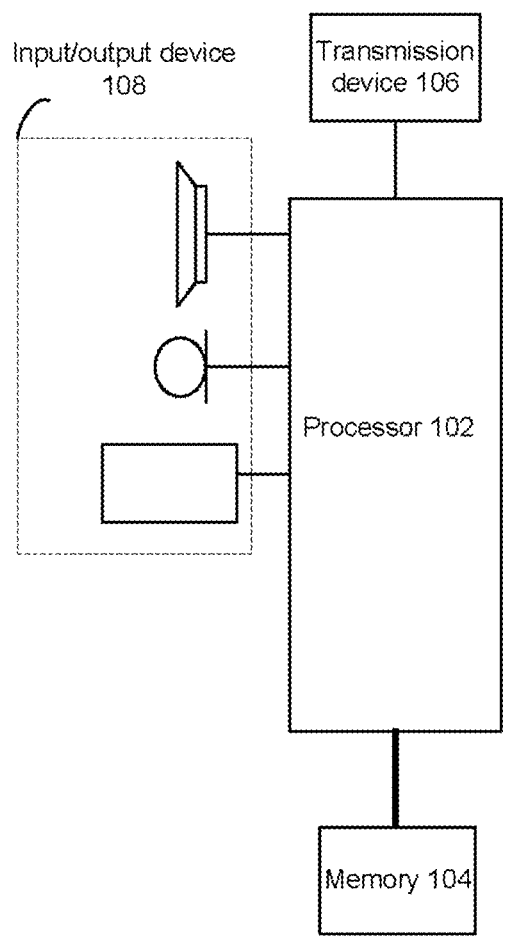
FIG. 1 is a block diagram of a hardware structure of a mobile terminal of an image processing method according to an embodiment of the present disclosure.

It is to be noted that in the case of no conflict, the features in the embodiments and the embodiments in the present application may be combined with each other. The disclosure is described below with reference to the drawings and in conjunction with the embodiments in detail.

In order to make those skilled in the art better understand the solutions of the present application, the technical solutions in the embodiments of the present application will be clearly and completely described below with reference to the drawings in the embodiments of the present application. It is apparent that the described embodiments are only a part of the embodiments of the present application, not all of the embodiments. All other embodiments obtained by those of ordinary skill in the art based on the embodiments of the present application without creative efforts should fall within the scope of protection of the present application.

It is to be noted that the specification and claims of the present application and the terms "first", "second" and the like in the drawings are used for distinguishing similar objects, and do not need to describe a specific sequence or a precedence order. It will be appreciated that data used in such a way may be exchanged under appropriate conditions, in order that the embodiments of the present application described here can be implemented. In addition, terms "include" and "have" and any variations thereof are intended to cover non-exclusive inclusions. For example, it is not limited for processes, methods, systems, products or devices containing a series of steps or components to clearly list those steps or components, and other steps or components which are not clearly listed or are inherent to these processes, methods, products or devices may be included instead.

The method embodiment provided by the embodiments of the present application may be implemented in a mobile terminal, a computer terminal or a similar computing device. Running on a mobile terminal is taken as an example. FIG. 1 is a block diagram of a hardware structure of a mobile terminal of an image processing method according to an embodiment of the present disclosure. As shown in FIG. 1, the mobile terminal may include one or more (only one is shown in FIG. 1) processors 102 (the processor 102 may comprise but is not limited to a processing apparatus such as a Micro Controller Unit (MCU) or a Field Programmable Gate Array (FPGA)) and a memory 104 for storing data. Optionally, the above mobile terminal may further include a transmission device 106 and an input/output device 108 for communication functions. Those skilled in the art can understand that the structure shown in FIG. 1 is merely illustrative, and does not limit the structure of the above mobile terminal. For example, the mobile terminal may also include more or fewer components than shown in FIG. 1, or has a different configuration from that shown in FIG. 1.

The memory 104 may be configured to store a computer program. For example, a software program and module of application software, such as a computer program corresponding to the image processing method in the embodiment of the present disclosure, and the processor 102 executes various functional applications and data processing by running the computer program stored in the memory 104, that is, implements the above method. The memory 104 may include a high speed random access memory and may also comprise a non-transitory memory such as one or more magnetic storage devices, a flash memory, or other non-volatile solid state memories. In some examples, the memory 104 may further comprise memories remotely located relative to the processor 102, which may be connected to the mobile terminal over a network. The examples of such networks comprise, but are not limited to, the Internet, the Intranet, local area networks, mobile communication networks, and combinations thereof.

The transmission device 106 is configured to receive or send data via a network. The above specific network example may include a wireless network provided by a communication provider of the mobile terminal. In one example, the transmission device 106 comprises a Network Interface Controller (NIC) that may be connected to other network devices through a base station to communicate with the Internet. In one example, the transmission device 106 may be a Radio Frequency (RF) module for communicating with the Internet wirelessly.

Figure 2:
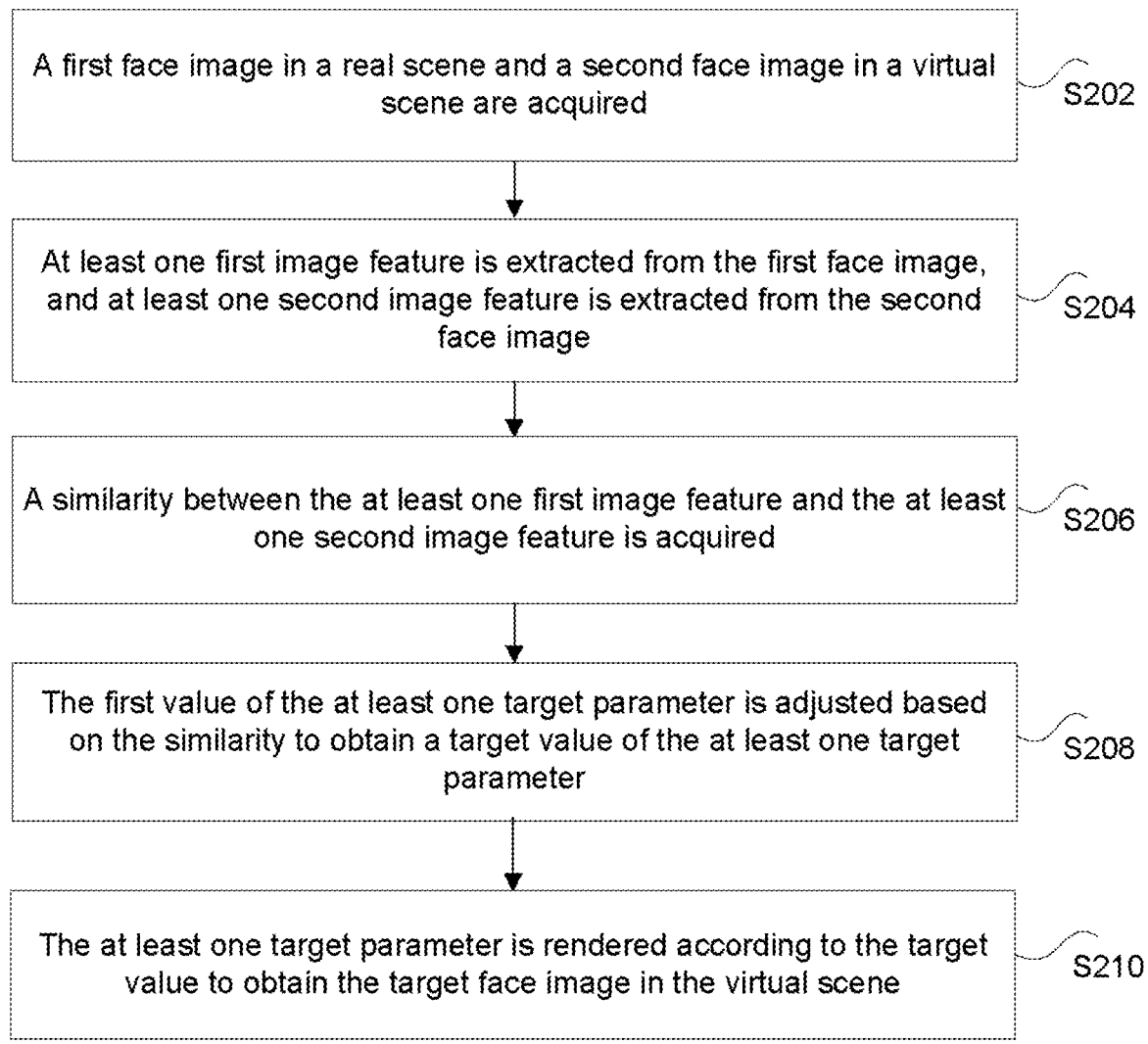
FIG. 2 is a flowchart of an image processing method according to an embodiment of the present disclosure.

In the present embodiment, an image processing method running on the above mobile terminal is provided. FIG. 2 is a flowchart of an image processing method according to an embodiment of the present disclosure. As shown in FIG. 2, the method comprises the following steps.

At step S202, a first face image in a real scene and a second face image in a virtual scene are acquired.

In the technical solution provided by the step S202 of the present disclosure, the first face image in the real scene and the second face image in the virtual scene are acquired, wherein the second face image is generated at least according to a first value of at least one target parameter, and the at least one target parameter is used for determining at least one attribute of a face image in the virtual scene.

In this embodiment, the real scene is a reality scene, and the first face image may be a face image of a player captured in the real scene, that is, the first face image is an input face image. The virtual scene may be a scene in which a virtual character created by the player is located, for example, a game scene. The second face image may be a face image, generated by a first value of at least one target parameter, in the virtual scene, for example, a face image of the virtual character. The at least one target parameter is used for determining at least one attribute of the face image in the virtual scene. For example, the at least one target parameter is a series of parameters used for determining at least one attribute, such as sizes, shapes and styles of hair, eyebrows, eyes, nose, mouth and other parts, which may be parameter to be optimized in this embodiment. Optionally, the at least one target parameter of this embodiment is a multi-dimensional facial parameters for controlling a game face model. According to adjusting the value of the at least one target parameter, an image of a personalized virtual character may be made.

The first value of the at least one target parameter in this embodiment may be a value initially set for the at least one target parameter. The second face image may be generated by the first value of the at least one target parameter. The second face image may be generated by a pre-trained generation model according to the first value of the at least one target parameter. The second face image may be an auto-creation result obtained by character auto-creation according to facial parameters, and may have a size of 512*512.

In this embodiment, face pinching is a game play in the game scene. When the virtual character is created by the player, the virtual character may be personalized via a character customization system to meet the player's pursuit of beauty. Optionally, the character customization system will provide for the player with rich control points for adjusting the shape of various positions on a game face of the virtual character. By setting the at least one target parameter corresponding to each control point, images of virtual characters with various facial appearance may be presented.

At step S204, at least one first image feature is extracted from the first face image, and at least one second image feature is extracted from the second face image.

In the technical solution provided by the step S204 of the present disclosure, after the first face image in the real scene and the second face image in the virtual scene are acquired, the at least one first image feature is extracted from the first face image, and the at least one second image feature is extracted from the second face image.

In this embodiment, the first face image has the at least one first image feature being used for indicating a feature of the first face image. The second face image has the at least one second image feature being used for indicating a feature of the second face image. For example, the at least one first image feature and the at least one second image feature may be used for indicating background, a face, hair, left eyebrow, right eyebrow, left eye, right eye, nose, upper lip, teeth, lower lips, and other facial features. The at least one second image feature may be a feature existing in the game.

In this embodiment, the at least one first image feature may be extracted from the first face image by a pre-trained feature extractor, and the at least one second image feature may be extracted from The second face image. That is, the first face image is input to the feature extractor to output the at least one first image feature, and The second face image is input to the feature extractor to output the at least one second image feature. The at least one first image feature and the at least one second image feature may be high-dimensional image features.

At step S206, a similarity between the at least one first image feature and the at least one second image feature is acquired.

In the technical solution provided by the step S206 of the present disclosure, after the at least one first image feature is extracted from the first face image and the at least one second image feature is extracted from the second face image, the similarity between the at least one first image feature and the at least one second image feature is acquired.

In this embodiment, the similarity between the at least one first image feature and the at least one second image feature may be used for indicating a degree of similarity in content between the first face image and the second face image, which may be represented by a loss function. The loss function may also determine a distance between the at least one first image feature and the at least one second image feature, wherein the loss function is an object function in an optimization algorithm of this embodiment. An L1 norm may be used for measuring the similarity in content between the second face image and the first face image. When the second face image is closer to the first face image, for example, when a game face image is closer to a real face image, the L1 norm is smaller. Optionally, this embodiment may also use an L2 norm to measure the similarity in content between the second face image and the first face image, wherein the L1 norm is more robust than the L2 norm.

Optionally, this embodiment expresses a loss function between the at least one first image feature and the at least one second image feature by formula:

$$\min_{x}\|f(g(x)) - f(I)\|_1 \text{ s.t. } x \in [0, 1],$$

wherein f(g(x)) is used for representing the at least one first image feature, f(I) is used for representing the at least one second image feature, and s.t. (subject to) is used for representing constraint conditions.

At step S208, the first value of the at least one target parameter is adjusted based on the similarity to obtain a target value of the at least one target parameter.

In the technical solution provided by the step S208 of the present disclosure, after the similarity between the at least one first image feature and the at least one second image feature is acquired, the first value of the at least one target parameter based on the similarity to obtain the target value of the at least one target parameter, wherein the target value is used for determining a target face image to be generated in the virtual scene, and a similarity between the target face image and the first face image is greater than or equal to a target threshold.

In this embodiment, after the similarity between the at least one first image feature and the at least one second image feature is acquired, when the similarity between the at least one first image feature and the at least one second image feature is determined smaller than the target threshold, the difference between the at least one first image feature and the at least one second image feature is large, and the first value of the at least one target parameter needs to be adjusted. After the first value of the at least one target parameter is adjusted, the first face image may be compared with a face image in the virtual scene generated by the adjusted value of the at least one target parameter. When the similarity between the first face image and the face image in the virtual scene generated by the adjusted value of the at least one target parameter is determined greater than or equal to the target threshold, the difference between the at least one first image feature and the at least one second image feature is small, and the similarity is high. The value adjusted previously for the at least one target parameter may be used as the final target value of the at least one target parameter. When the similarity between the first face image and the face image in the virtual scene generated by the adjusted value of the at least one target parameter is determined smaller than the target threshold, adjustment is continuously performed based on the value adjusted previously for the at least one target parameter, and iteration is performed continuously until the similarity between the first face image and the face image in the virtual scene is greater than or equal to the target threshold, and the value finally adjusted for the at least one target parameter is used as the final target value of the at least one target parameter.

The target value of the at least one target parameter of this embodiment may be used for determining the target face image to be generated in the virtual scene, and the similarity between the target face image and the first face image is greater than or equal to the target threshold. The target face image may be the face image in the virtual scene, which needs to be determined finally and is close to the first face image.

At step S210, the at least one target parameter is rendered according to the target value to obtain the target face image in the virtual scene.

In the technical solution provided by the step S210 of the present disclosure, after the first value of the at least one target parameter is adjusted based on the similarity to obtain the target value of the at least one target parameter, the at least one target parameter is rendered according to the target value to obtain the target face image in the virtual scene.

The at least one target parameter of this embodiment may be at least one parameter identified by a client, and the target face image of the virtual character is rendered by the client according to the target value of the at least one target parameter. The color of the target face image is not only similar to the color of the first face image as a whole, but also image features of hair, eyes, nose, and other parts may also be transformed to shapes existing in the game, so as to obtain an intuitive style transfer result for the first face image.

In this embodiment, the first face image may be transformed according to a style comprised in the face image in the virtual scene, while retaining original semantic content, which may be performed by a neural style transfer model and generative adversarial model. The neural style transfer model may use semantic characteristics of features to construct content loss function and style loss function for at least one features at different depths, so as to separate the content and style of the image, and finally achieve the purpose of style transfer. The generative adversarial model constructs Nash equilibrium points and uses neural networks to model the style itself. Unlike the former, which only migrates for a single image, the latter can learn the overall style of a dataset.

Through the above method, the character customization system may automatically generate the target face image, which can be a final game face of the virtual character and similar to the input face image of the player, wherein the final game face can be a three-dimensional game face, that is, the input face image is transformed into a game style, which can automatically pinch the face, and further output facial parameters for identification and rendering by the client which can be a game client.

Through the step S202 to the step S210, the first face image in the real scene and the second face image in the virtual scene are acquired, wherein the second face image is generated at least according to the first value of at least one target parameter, and the at least one target parameter is used for determining at least one attribute of the face image in the virtual scene; the at least one first image feature is extracted from the first face image, and the at least one second image feature is extracted from the second face image; the similarity between the at least one first image feature and the at least one second image feature is acquired; the first value of the at least one target parameter is adjusted based on the similarity to obtain the target value of the at least one target parameter, wherein the target value is used for determining the target face image to be generated in the virtual scene, and the similarity between the target face image and the first face image is greater than or equal to the target threshold; and the at least one target parameter is rendered according to the target value to obtain the target face image in the virtual scene. The value of the at least one target parameter is adjusted through the similarity between the at least one first image feature of the first face image and the at least one second image feature of the second face image until the value of the at least one target parameter is adjusted to the target value, so that the similarity between the target face image determined by the target value of the at least one target parameter and the first face image is greater than or equal to the target threshold, which achieves the purpose of converting an input face image in the real scene into the face image in the virtual scene, avoids a result of similar overall color, improves the technical effect of the truth of transforming the input face image into the face image in the virtual scene, and solves the technical problem of low-level simulation in transformation from the input face image to the face image in the virtual scene.

As an optional implementation manner, the step S208 of the first value of the at least one target parameter is adjusted based on the similarity to obtain the target value of the at least one target parameter comprises: a determining step of determining whether the similarity is smaller than the target threshold, when determining the similarity is smaller than the target threshold and a number of adjustments for the at least one target parameter is smaller than a target number, performing an adjusting step, and when determining the similarity is greater than or equal to the target threshold, or a number of adjustments for the at least one target parameter is equal to a target number, the first value of the at least one target parameter is determined as the target value of the at least one target parameter; the adjusting step of adjusting the first value of the at least one target parameter according to a target adjustment value to obtain a second value of the at least one target parameter; a generating step of generating a third face image in the virtual scene by the second value of the at least one target parameter; and an acquiring step of extracting a third image feature from the third face image, acquiring a similarity between the at least one first image feature and the at least one third image feature, taking the second value of the at least one target parameter as the first value of the at least one target parameter, and returning to the determining step.

In this embodiment, when the first value of the at least one target parameter is adjusted based on the similarity, the determining step, the adjusting step and the acquiring step may be comprised. At the determining step, it may be determined whether the similarity between the at least one first image feature and the at least one second image feature is smaller than the target threshold, wherein the target threshold is a critical value for measuring the magnitude of a degree of similarity between the first face image and the second face image. Optionally, this embodiment also sets a target number of adjustments for the at least one target parameter, that is, a maximum number of adjustments for the at least one target parameter. The target number may be an optimal number of iterations directly set according to an experience obtained from multiple tests and requirement of the application scenario. When the similarity between the first face image and the second face image is determined smaller than the target threshold and the number of adjustments is determined smaller than the target number, that is, the similarity between the at least one first image feature and the at least one second image feature is low and the number of adjustments for the at least one target parameter is smaller than the target number, the adjusting step may be, that is, the at least one target parameter is continuously adjusted. When the similarity between the first face image and the second face image is determined greater than or equal to the target threshold, that is, the similarity between the at least one first image feature and the at least one second image feature is determined high, or that the number of adjustments for the at least one target parameter is determined already equal to the target number, that is, the number of adjustments for the at least one target parameter has reached the maximum number, the first value of the at least one target parameter may be directly determined as the target value of the at least one target parameter. When the number of adjustments for the at least one target parameter is determined equal to the target number, the first value of the at least one target parameter may be performed by the pre-trained generative model to obtain a face image that may be used as the style transfer of the first face image.

At the adjusting step, the first value of the at least one target parameter is adjusted according to the target adjustment value to obtain the second value of the at least one target parameter, thereby realizing the optimization of the at least one target parameter, wherein the target adjustment value is used for adjusting the first value of the at least one target parameter, and may be an adjustment step size set according to the experience obtained from multiple tests and the requirement of the application scenario.

After adjusting the first value of the at least one target parameter according to the target adjustment value to obtain the second value of the at least one target parameter. At the generating step, the third face image in the virtual scene may be generated by using the second value of the at least one target parameter. For example, the second value of the at least one target parameter is input into the pre-trained generation model, and then the third face image is output.

At the acquiring step, the at least one third image feature is extracted from the third face image, and the similarity between the at least one first image feature and the at least one third image feature is acquired. The similarity between the at least one first image feature and the at least one third image feature may be used for indicating a degree of similarity in content between the first face image and the third face image, which may be represented by the loss function. The loss function may also determine a distance between the at least one first image feature and the at least one third image feature. At this time, the second value of the at least one target parameter is used as the first value of the at least one target parameter, and the process returns to the determining step to continue. That is, it is continuously determining whether the current acquired similarity between the at least one first image feature and the at least one third image feature is smaller than the target threshold, when the similarity between the at least one first image feature and the at least one third image feature is smaller than the target threshold and the number of adjustments for target parameter is smaller than the target number, the adjusting step is performed, and when the similarity between the at least one first image feature and the at least one third image feature is greater than or equal to the target threshold, or the number of adjustments is equal to the target number, the first value of the at least one target parameter is determined as the target value of the at least one target parameter; at the adjusting step, the first value of the at least one target parameter is adjusted according to the target adjustment value to obtain another second value of the at least one target parameter; in the generating step, another third face image in the virtual scene is generated by the another second value of the at least one target parameter; and in the acquiring step, another third image feature is extracted from the another third face image, a similarity between the at least one first image feature and the another third image feature is acquired, the another second value of the at least one target parameter is taken as the first value of the at least one target parameter, and the process returns to the determining step. The process proceeds in such a way until the target value of the at least one target parameter is obtained.

Optionally, this embodiment may set the content loss function, which is also a object function in an optimization algorithm of this embodiment, and uses the L1 norm to measure the similarity in content between the third face image and the input first face image, that is, as the game face is closer to the real face, the L1 norm is smaller, which may be expressed by an optimization model $$\min_x \|f(g(x)) - f(I)\|_1 \text{ s.t.} x \in [0, 1].$$

Optionally, in this embodiment, a gradient descent method or a derivative algorithm thereof may be used for optimizing the target value of the at least one target parameter. The gradient descent method may be used for solving the optimization model of $$\min_x \|f(g(x)) - f(I)\|_1 \text{ s.t.} x \in [0, 1].$$

Optionally, a deep learning framework is used for calculating the gradient of the object function at an independent variable (the at least one target parameter), and the gradient descent method is used for iterating continuously. The value of the at least one target parameter may be adjusted according to an adjustment step size, so that the L1 norm becomes smaller until a minimum value of the loss function is found, wherein the adjustment step size may be set according to the experience obtained from multiple tests and the requirement of the application scenario. Optionally, when the number of iterations of the at least one target parameter reaches a maximum number of iterations, the value of the at least one target parameter that is finally adjusted is determined as the target value of the at least one target parameter, so as to achieve the iterative optimization of the at least one target parameter. The value of the at least one target parameter when the maximum number of iterations is reached is processed by the pre-trained generation model to obtain a face image after the style transfer.

As an optional implementation manner, the step S202 of the first face image in a real scene is acquired comprises: an original face image in the real scene is acquired; and the original face image is pre-processed according to a reference face image in the virtual scene to obtain the first face image, wherein the first face image corresponds to at least one first target parameter of the reference face image, and the at least one first target parameter is a part of the at least one target parameter and comprises at least one of the followings: sizes of facial features and positions of facial features.

In this embodiment, when the first face image is acquired, the original face image in the real scene may be acquired first, wherein the original face image is used for providing detailed features of the face. For example, the face image. optionally, the original face image is a target image comprising a front face, and may be a high-definition front head portrait without glasses.

In this embodiment, the original face image may be pre-processed, so that the original face image corresponds to the face image in the virtual scene, that is, a real face corresponds to a game face. The original face image may be pre-processed through a preset reference face image to obtain the first face image, wherein the reference face image is also a reference face with moderate positions of the facial features in the virtual scene, and is used for aligning with the first face image, so that the first face image corresponds to the at least one first target parameter of the reference face image, the at least one first target parameter is a part of the at least one target parameter, and may comprise sizes of facial features and positions of facial features, that is, the first face image and the reference face image may be of equal size and at corresponding positions, thereby improving the similarity between the final face image in the virtual scene and the original face image.

Optionally, in this embodiment, when the original face image is pre-processed by using the reference face image in the virtual scene, face detection and facial landmarks extraction algorithms in a Dlib machine learning library may be used for implementation. Optionally, in this embodiment, the face detection is performed on the original face image to obtain a coordinate position of a face circumscribed rectangle in the image, and then the facial landmarks are extracted from the reference face image and the original face image, respectively, to obtain two groups of 68 facial landmarks, which are used for finally calculating an affine matrix. The affine matrix may be used for transforming the original face image to a face image corresponding to the reference face image in sizes and positions of facial features.

As an optional implementation manner, before the original face image is adjusted by the reference face image in the virtual scene to obtain the first face image, the method further comprises: a value of at least one first type parameter comprised in the at least one target parameter is set to a third value, wherein the at least one first type parameter is used for indicating a shape of the target face image; one-hot encoding is performed on at least one second type parameter comprised in the at least one target parameter to obtain an encoded value, wherein the at least one second type parameter is used for indicating a style of the target face image; and the reference face image is generated according to the third value and the encoded value.

In this embodiment, before the original face image is adjusted through the reference face image in the virtual scene to obtain the first face image, the reference face image may be preset. Because there may be many possible situations of the face image in the virtual scene, for example, there may be many possible situations of the image of the game face, the value of the at least one first type parameter comprised in the at least one target parameter may be uniformly set to the third value. The at least one first type parameter comprised in the at least one target parameter is used for indicating the shape of the target face image, which may be continuous parameters of the at least one target parameter for describing the translation, rotation, and pitch of each position of the face image in the virtual scene. The three-dimensional shape of the face image may be directly controlled, and the face image may be directly input into a neural network. Optionally, in this embodiment, all possible face images are replaced with an average face image, and the continuous parameters portion of an input target parameter may be all set to 0.5 by the pre-trained generation model.

The at least one target parameter of this embodiment may also comprise the at least one second type parameter, which may be used for indicating the style of the target face image, may be the discrete parameters portion comprised in the at least one target parameter for indicating hairstyles, eyebrow shapes, and other optional appearance styles. Since these styles are independent of each other, one-hot encoding of the at least one second type parameter comprised in the at least one target parameter may be performed to obtain an encoded value. The one-hot encoding may be a code system in which there are as many bits as states and only one bit is 1 while the others are all 0. For example, when the face image has five hairstyle appearances, the features of the hairstyle appearances are stored as a five-bit value, and the encoded values of the five appearance features may be 00001, 00010, 00100, 01000, and 10000. In this embodiment, a one-hot code may be selected from the at least one second type parameter, so as to generate the reference face image, which is a face image in the virtual scene with moderate positions of facial features and is used for aligning with the first face image.

After the value of the at least one first type parameter comprised in the at least one target parameter is set to the third value and performing one-hot encoding on the at least one second type parameter comprised in the at least one target parameter to obtain the encoded value, the reference face image is generated according to the third value and the encoded value to further pre-process the original face image to obtain the first face image of this embodiment.

As an optional implementation manner, before the first value of the at least one target parameter is adjusted based on the similarity to obtain a target value of the at least one target parameter, the method further comprises: the at least one target parameter is initialized to obtain the first value of the at least one target parameter.

In this embodiment, the at least one target parameter is at least one parameter to be optimized in this embodiment. Since an optimization result of non-linear optimization has a large relationship with the initialization of an independent variables, in order to improve the accuracy of face image generation in the virtual scene in this embodiment, before the first value of the at least one target parameter is adjusted based on the similarity to obtain a target value of the at least one target parameter, the at least one target parameter is initialized, for example, facial parameters initialized to obtain the first value of the at least one target parameter.

As an optional implementation manner, the operation that the at least one target parameter is initialized to obtain the first value of the at least one target parameter comprises: a value of a at least one first type parameter comprised in the at least one target parameter is set to a third value, wherein the at least one first type parameter is used for indicating a shape of the target face image; one-hot encoding is performed on a value of a at least one second type parameter comprised in the at least one target parameter to obtain an encoded value, wherein the at least one second type parameter is used for indicating a style of the target face image; and the third value and the encoded value are determined as the first value of the at least one target parameter.

In this embodiment, the at least one target parameter comprises the at least one first type parameter and the at least one second type parameter. When the at least one target parameter is initialized, the at least one target parameter may be initialized in the same way as acquiring the reference face image, the value of the at least one first type parameter comprised in the at least one target parameter is set to the third value, all the continuous parameters portions of the input target parameter may be set to 0.5 according to the pre-trained generation model, one-hot encoding is performed on the at least one second type parameter comprised in the at least one target parameter to obtain the encoded value, that is, the second face image generated according to the initialized target parameter may be the same as the reference face image.

As an optional implementation manner, the step S202 of a second face image in a virtual scene is acquired comprises: the first value of the at least one target parameter is processed according to a first target model to obtain the second face image, wherein the first target model is obtained according to training a first sub-target model through at least one historical face image generated in the virtual scene and a value of at least one target parameter for generating the at least one historical face image.

In this embodiment, the first target model may be a generation model or a generator, belonging to a neural network model, and may be obtained according to training the first sub-target model through the at least one historical face image generated in the virtual scene and the value of at least one target parameter for generating the at least one historical face image. For example, training data of the first target model may be derived from the auto-creation result already generated according to the game client and corresponding the facial parameters, that is, the first target model is trained according to using the face image rendered according to the game client and the corresponding facial parameters. The first sub-target model may be a detection model initially established. According to the first value of the at least one target parameter is inputted into the first target model, the second face image may be output.

Optionally, the first target model of this embodiment may be the neural network model obtained through deep learning training, wherein the deep learning is a machine learning algorithm composed of large-scale neurons, which can well solve complex non-linear problems. Optionally, the first target model is obtained according to training a deep convolutional neural network composed of a series of deconvolution layers. A mathematical model may be $Y=g(x)$, wherein the input may be a multi-dimensional target parameter X, a value range of each dimension may be [0,1], and the output is a colored face image Y in a virtual scene with an image size of 512*512. The at least one target parameter comprise continuous parameters and discrete parameters. The continuous parameters are used for describing the translation, rotation, and pitch of each position of the face image, may directly control the three-dimensional shape of the face image and may be directly input into the first target model. The discrete parameters are used for describing hairstyles, eyebrow shapes, and other optional appearance styles. Since these styles are independent of each other, it is necessary to perform one-hot encoding before being input into the first target model.

Each dimension of the at least one target parameter in this embodiment may be randomly generated under a uniform distribution, and a value of the randomly generated target parameter is used as the value of the at least one target parameter for generating the at least one historical face image. The at least one target parameter randomly generated may be further rendered according to the game client to obtain the game face image, and the game face image is used as the at least one historical face image. When the first sub-target model is trained based on the at least one historical face image generated in the virtual scene and the value of the at least one target parameter for generating the at least one historical face image, a Pytorch deep learning framework may be used and a random gradient descent method may be selected to select an L1 loss function as the loss function, and training for 500 epoch is performed to obtain the neural network model with good performance.

Optionally, when the number of adjustments for the at least one target parameter is equal to a target number, the value obtained according to the last adjustment of the at least one target parameter may be processed through the first target model to obtain the face image in the virtual scene, that is, the auto-creation result.

As an optional implementation manner, the step S204 of the at least one first image feature is extracted from the first face image and the at least one second image feature is extracted from the second face image comprises: the first face image is processed according to a second target model to obtain the at least one first image feature, and the second face image is processed according to the second target model to obtain the at least one second image feature, where in the second target model is obtained according to training a second sub-target model through at least one historical face image generated in the virtual scene and an image feature of the at least one historical face image.

In this embodiment, the second target model may be a feature extractor, and may be the deep convolutional neural network constructed based on a deep residual network, obtained according to training a second sub-target model through the at least one historical face image generated in the virtual scene and the image feature of the at least one historical face image, wherein the second sub-target model may be the detection model initially established.

Optionally, the mathematical model of the second target model in this embodiment is $F=f(Y)$, the input is the first face image and the second face image, for example, a colored face image, comprising a face image in the real scene and a game image in the virtual scene. In this embodiment, the size of the input image may be limited to 256*256. The output is the at least one first image feature and the at least one second image feature. The at least one first image feature and the at least one second image feature may be high-dimensional image features F, which are composed of features of different depths.

Optionally, at least one model parameter of the second target model in this embodiment may adopt at least one model parameter pre-trained through an Image Net dataset, or may be trained according to face data. For example, the second target model is trained according to a Helen face semantic segmentation dataset. Optionally, the semantic labels of the dataset are divided into 11 categories, which are background, face, hair, left eyebrow, right eyebrow, left eye, right eye, nose, upper lip, tooth, lower lip and so on.

The training method for the second target model in this embodiment may be similar to the training method for the first target model, except that the loss function needs to select cross-entropy to measure the pixel-by-pixel classification task. Optionally, each pixel of the face image is classified to determine the category of the pixel belonging to 11 semantic labels. The loss function uses a cross-entropy loss function in image classification. In response to the actual category of a pixel is y (one-hot code form, a total of K categories), and the output of a model for the pixel is x, the cross-entropy loss of the pixel point is calculated as $L=\Sigma_{k=1}^{K} y_k \log p_k$, where $$p_k = \frac{e^{x_i}}{\sum_{k=1}^{K} e^{x_k}}.$$

As an optional implementation manner, the first face image, the second face image and the target face image are three-dimensional face images, thereby improving the truth of the style transfer and improving the user experience.

In this embodiment, according to the method, the at least one target parameter are taken as an independent variable to acquire the first face image and the second face image, the at least one first image feature of the first face image and the at least one second image feature of the second face image are extracted, the similarity of the two image features is further calculated, the first value of the at least one target parameter is adjusted based on the similarity, a target value of the at least one target parameter is finally obtained, and the at least one target parameter is rendered on a client according to the target value to obtain the target face image, thereby avoiding the result that only the overall color is similar, improving the technical effect of transforming the input face image into the face image in the virtual scene, and solving the technical problem of low-level simulation in transformation from the input face image to the face image in the virtual scene.

The technical solution of the present disclosure is described below with reference to a preferred implementation manner, and the face image is specifically described as an example of a face image.

An algorithm of character auto-creation involved in this present disclosure may transform an input face image into a game style, and further output facial parameters for a game client to identify and render.

Figure 3:
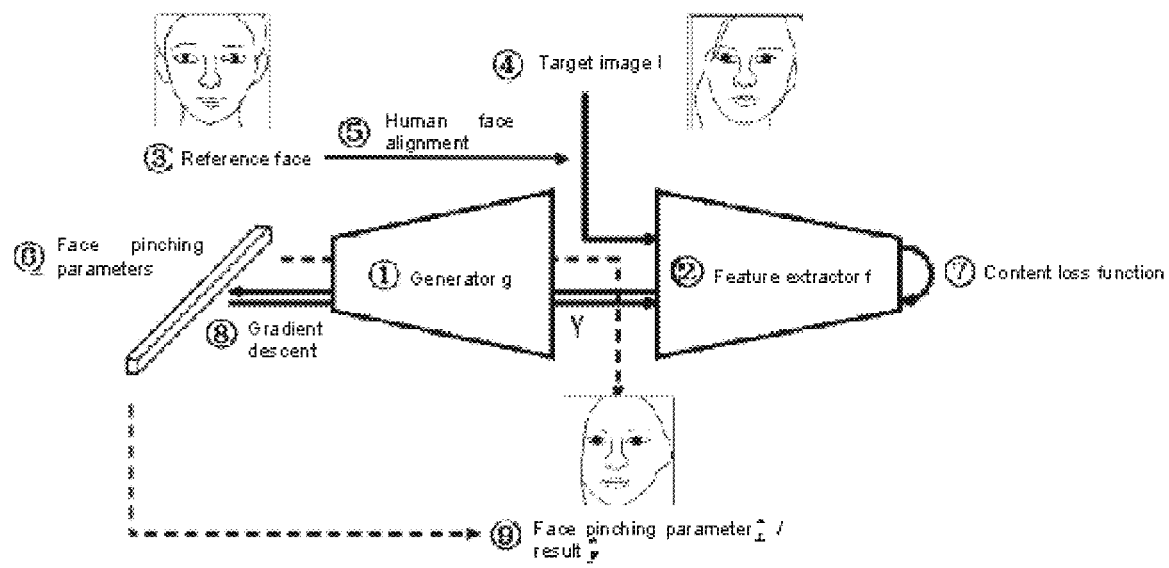
FIG. 3 is a schematic diagram of an character customization system according to an embodiment of the present disclosure.

FIG. 3 is a schematic diagram of an character customization system method according to an embodiment of the present disclosure. As shown in FIG. 3, the character customization system involves a generator g, a feature extractor f, a reference face, a target image I, face alignment, initialized facial parameters x, setting a content loss function, gradient descent, and outputting facial parameters x̂/result ŷ.

(1) The generator of this embodiment is described as follows.

The generator of this embodiment may be a deep convolutional neural network composed of a series of deconvolution layers. A mathematical model is Y=g(x), the input is a multi-dimensional facial parameters X, a value range of each dimension is [0,1], and the output is a colored game face image Y with an image size of 512*512. The multi-dimensional facial parameters comprises two parts namely continuous parameters and discrete parameters. The continuous parameters are used for describing the translation, rotation, and pitch of each position in a game face, directly controls the three-dimensional shape of the face and may be directly input into a neural network. The discrete parameters refer to hairstyles, eyebrow shapes, and other optional appearance styles. Since these styles are independent of each other, it is necessary to perform one-hot encoding before being input into the neural network.

In this embodiment, the generator may be trained according to using a face image rendered according to the game client and facial parameters corresponding to the face image.

Each dimension of the facial parameters is randomly generated under a uniform distribution. The game client may further render the randomly generated facial parameters to obtain the game face image. When training, a Pytorch deep learning framework may be used and a random gradient descent method may be selected an L1 loss function as a loss function, and training for 500 epoch is performed to obtain a neural network model with good performance.

(2) The feature extractor of this embodiment is described as follows.

The feature extractor of this embodiment is a deep convolutional neural network constructed based on a deep residual network, wherein mathematical model may be F=f(Y), the input is a colored face image (a face image in a real scene/a game image in a game scene), the image size may be limited to 256*256, and the output is a high-dimensional image feature F, composed of features of different depths.

At least one model parameter of the feature extractor in this embodiment may adopt at least one model parameter pre-trained through an Image Net dataset, or may be trained according to face data. For example, the feature extractor is trained according to a Helen face semantic segmentation dataset, wherein semantic labels of the dataset are divided into 11 categories, which are background, face, hair, left eyebrow, right eyebrow, left eye, right eye, nose, upper lip, tooth, lower lip and so on. The training method may be similar to the training method for the generator, except that the loss function needs to select cross-entropy to measure the pixel-by-pixel classification task. Optionally, each pixel of the face image is classified to determine the category of the pixel belonging to 11 semantic labels. The loss function uses a cross-entropy loss function in image classification. In response to the actual category of a pixel is y (one-hot code form, a total of K categories), and the output of a model for the pixel is x, the cross-entropy loss of the pixel point is calculated as $L=\Sigma_{k=1}^{K} y_k \log p_k$.

(3) The reference face of this embodiment is described as follows.

In order to improve the similarity between an auto-creation result and an input face image in this embodiment, the input face image needs to be pre-processed, so that a real face corresponds to the game face. Since there are many possible situations for the game face, this embodiment may use an average face instead of all possible face images. Optionally, the average face of this embodiment is to set all the continuous parameters input according to the generator to 0.5 and select any one of one-hot codes for the discrete parameters to generate the game face image with moderate positions of facial features, which are used as the reference face for subsequent face alignment.

(4) The target image of this embodiment is described as follows.

The target image in this embodiment is mainly used for providing detail features of a face, and may be a high-definition front portrait without glasses.

(5) The face alignment of this embodiment is described as follows.

In order to align an input target image with the reference face, this embodiment is implemented to use face detection and face key point extraction algorithms in the Dlib machine learning library. Optionally, in this embodiment, the face detection is first performed on the input target image to obtain a coordinate position of a face circumscribed rectangle in the image, and then the facial landmarks are extracted from the reference face and the input target image, respectively, to obtain two groups of 68 facial landmarks, which are used for finally calculating an affine matrix. The affine matrix may be used for transforming the target image to a face image corresponding to the reference face in sizes and positions of facial features.

(6) The initialized facial parameters x of this embodiment are described below.

The facial parameters in this embodiment are variable x to be optimized in this embodiment. The facial parameters comprises two parts: continuous parameters and discrete parameters, wherein the latter needs to be encoded as a one-hot code. Because the optimization result of the non-linear optimization problem has a large relationship with the initialization of the independent variables, in order to improve the accuracy of character auto-creation, this embodiment initializes the facial parameters, and may initialize the facial parameters by using the method identical to acquisition of the reference face.

(7) The content loss function of this embodiment is described as follows.

The content loss function of this embodiment, that is, an object function in an optimization algorithm may use an L1 norm to measure a similarity in content between an auto-creation result and the input face image, that is, as the game face is closer to the real face, the L1 norm is smaller. Optionally, the mathematical model of the content loss function of this embodiment may be expressed as the following form:

$$\min_x \|f(g(x)) - f(I)\|_1 \text{ s.t. } x \in [0, 1],$$

wherein f(g(x)) is used for representing the features of a real face image, f(I) is used for representing the features of a game face, and s.t. is used for representing constraint conditions.

(8) The gradient descent method of this embodiment is described as follows.

In this embodiment, since the deep learning model generally contains massive parameters, it is very difficult to solve a massive matrix inverse. Therefore, the deep learning model of this embodiment is a first-order model, that is, the gradient descent method or its derivative algorithm to optimize the object function.

Optionally, this embodiment uses the gradient descent method to solve $$\min_x \|f(g(x)) - f(I)\|_1 \text{ s.t. } x \in [0, 1].$$

Since both the generator Y=g(x) and the feature extractor F=f(Y) are neural networks, the Pytorch deep learning framework may be used for calculating the gradient of the object function at the independent variable x, thereby iteratively optimizing the facial parameters.

(9) The facial parameters $\hat{x}$/result $\hat{Y}$ is output as follows.

When a number of iterations of the facial parameters reach a maximum number of iterations, optimized facial parameters at this time is the facial parameters finally output in this embodiment.

Further, in order to obtain an intuitive style transfer result, this embodiment may further input the optimized facial parameters into the generator, and then obtain a game face image with a similar appearance to the input face image, thereby obtaining the auto-creation result.

An algorithm of character auto-creation may transform an input face image into a game style, and further output the facial parameters for a game client to identify and render, thereby improving the effect of the truth of transforming the input face image to the face image in the virtual scene.

Figure 4:
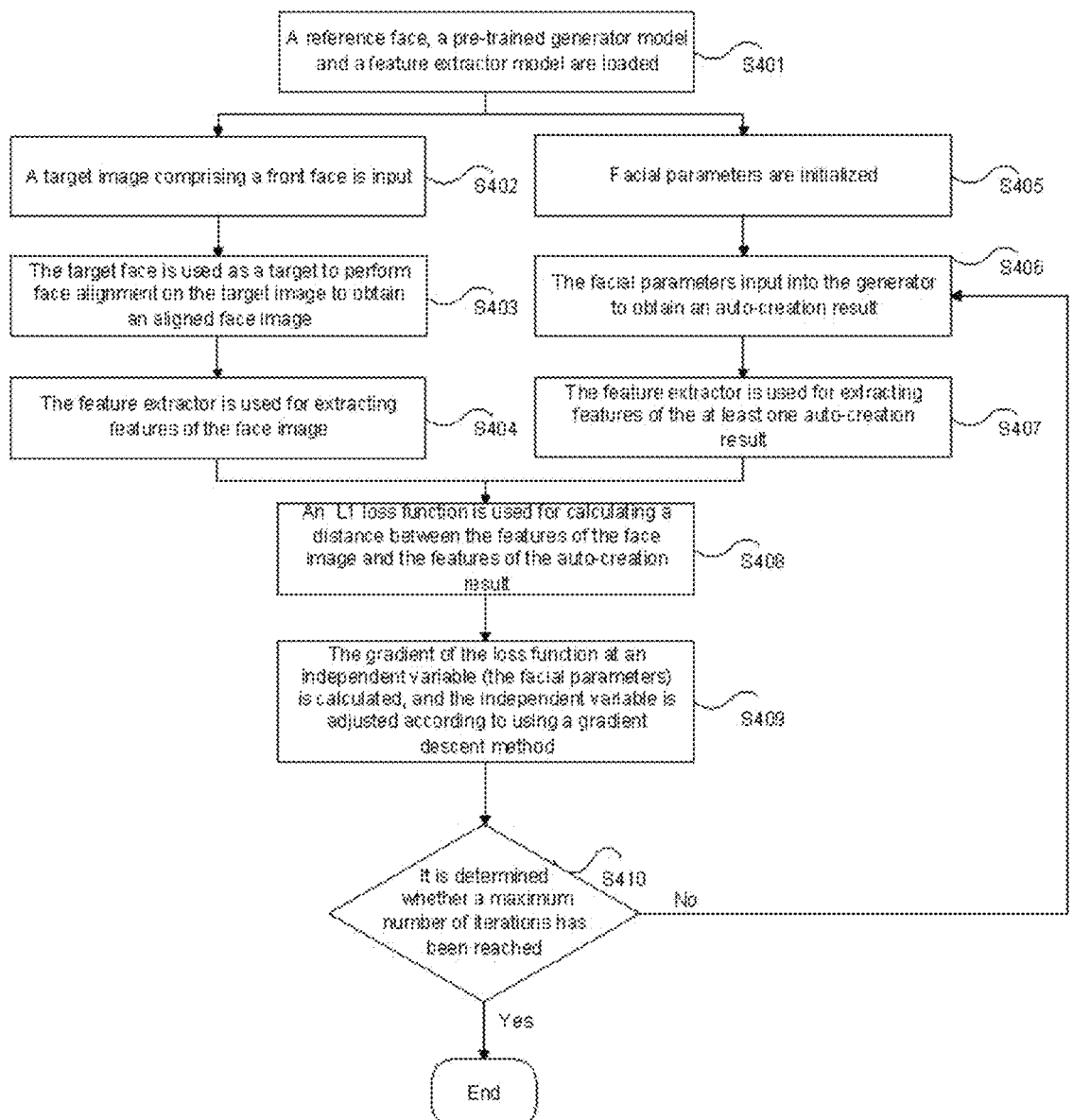
FIG. 4 is a flowchart of a method of character auto-creation according to an embodiment of the present disclosure.

FIG. 4 is a flowchart of a method of character auto-creation according to an embodiment of the present disclosure. As shown in FIG. 4, the method comprises the following steps.

At step S401, a reference face, a pre-trained generator model and a feature extractor model are loaded.

At step S402, a target image comprising a front face is input.

The target image in this embodiment should be a high-definition front portrait without glasses.

At step S403, the target face is used as a target to perform face alignment on the target image to obtain an aligned face image.

At step S404, the feature extractor is used for extracting features of the face image.

At step S405, facial parameters are initialized.

At step S406, the facial parameters input into the generator to obtain an auto-creation result.

At step S407, the feature extractor is used for extracting features of the at least one auto-creation result.

At step S408, an L1 loss function is used for calculating a distance between the features of the face image and the features of the auto-creation result.

At step S409, the gradient of the loss function at an independent variable (the facial parameters) is calculated, and the independent variable is adjusted according to using a gradient descent method.

At step S410, it is determined whether a maximum number of iterations has been reached.

In response to that the maximum number of iterations is reached, the optimized facial parameters at this time is the facial parameters finally output in this embodiment. In response to that the maximum number of iterations is not reached, the step S406 to the step S410 are continuously performed until the maximum number of iterations is reached. The value of the optimized parameter may be further input into the generator, and a style transfer result can be obtained.

Figure 5:
FIG. 5 is a schematic diagram of a comparison between auto-creation result according to an embodiment of the present disclosure.

FIG. 5 is a schematic diagram of a comparison between auto-creation result according to an embodiment of the present disclosure. As shown in FIG. 5, a left image is an input target image, a middle image is the auto-creation result output according to an algorithm of character auto-creation in this embodiment, and a right image is a result obtained according to rendering the facial parameters output according to a game client through the algorithm of character auto-creation.

It can be seen from FIG. 5 that the auto-creation result has a high similarity with the input target image, and the corresponding facial parameters may render the same face image via the game client, which improves the truth of transforming the input face image to the face image in the virtual scene.

This embodiment contains two pre-trained neural network models. The first model is a generation model, the input are facial parameters, the output is an auto-creation result, and training data comes from an auto-creation result and corresponding facial parameters already generated according to the game client. The second model is a feature extractor, the input is a face image (real face image or game face) and an auto-creation result, and the output is a high-dimensional image feature. The facial parameters are used as an independent variable, the generation model is used for obtaining the auto-creation result, the feature extractor is used for extracting the auto-creation result and the input face image feature respectively, the distance between the two groups of features is further calculated, that is, the loss function is calculated, and the gradient of the loss function at the independent variable is finally calculated and the independent variable is adjusted to the maximum number of iterations according to using the gradient descent method. At this time, the value of the independent variable is the parameter obtained according to the algorithm of character auto-creation. Then the game face image after the style transfer may be obtained according to the generation model.

In this embodiment, according to constructing the above neural network structure and adjusting the independent variable according to using the gradient descent method, it is required to output the facial parameters for character auto-creation, then the auto-creation result is generated according to the generator according to the facial parameters output according to the algorithm, the purpose of character auto-creation is achieved, and the facial parameters may directly render the corresponding three-dimensional face according to the game client, and the style of the input face image is transformed to the style of the virtual character, thereby solving the technical problem of low-level simulation in transformation from the input face image to the face image in the virtual scene, and improving the truth of transforming the input face image into the face image in the virtual scene.

It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

An embodiment of the present disclosure also provides an image processing apparatus. It is to be noted that the image processing apparatus of this embodiment may be used for performing the image processing method of the embodiment of the present disclosure.

Figure 6:
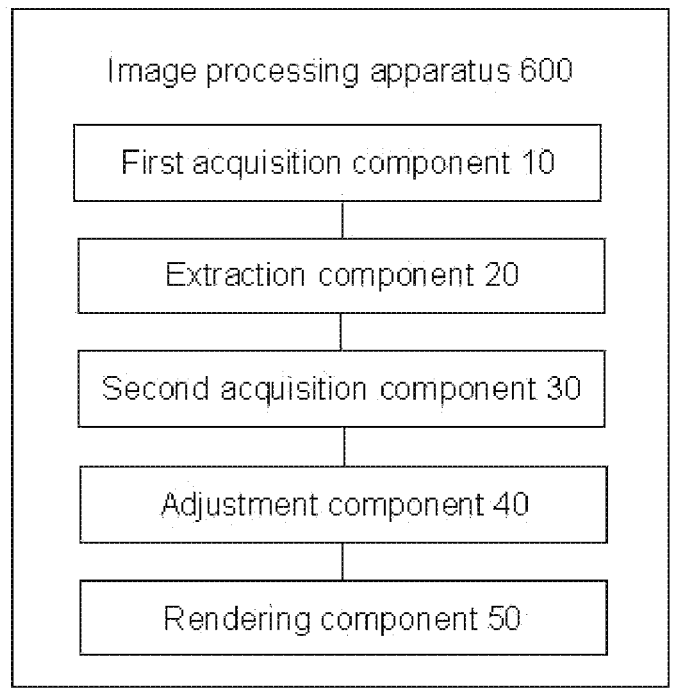
FIG. 6 is a schematic diagram of an image processing apparatus according to an embodiment of the present disclosure.

FIG. 6 is a schematic diagram image processing apparatus according to an embodiment of the present disclosure. As shown in FIG. 6, the image processing apparatus 600 comprises: a first acquisition component 10, an extraction component 20, a second acquisition component 30, an adjustment component 40, and a rendering component 50.

The first acquisition component 10 is configured to acquire a first face image in a real scene and a second face image in a virtual scene, wherein the second face image is generated at least according to a first value of at least one target parameter, and the at least one target parameter is used for determining at least one attribute of a face image in the virtual scene.

The extraction component 20 is configured to extract at least one first image feature from the first face image, and extract at least one second image feature from the second face image.

The second acquisition component 30 is configured to acquire a similarity between the at least one first image feature and the at least one second image feature.

The adjustment component 40 is configured to adjust the first value of the at least one target parameter based on the similarity to obtain a target value of the at least one target parameter, wherein the target value of the at least one target parameter is used for determining a target face image to be generated in the virtual scene, and a similarity between the target face image and the first face image is greater than or equal to a target threshold.

The rendering component 50 is configured to render the at least one target parameter according to the target value to obtain the target face image in the virtual scene.

Optionally, the adjustment component 40 comprises: a judgment module, configured to perform a determining step of determining whether the similarity is smaller than the target threshold, in response to that the similarity is smaller than the target threshold and a number of adjustments for the at least one target parameter is smaller than a target number, performing an adjusting step, and in response to that the similarity is greater than or equal to the target threshold, or a number of adjustments for the at least one target parameter is equal to a target number, determining the first value of the at least one target parameter as the target value of the at least one target parameter; an adjustment module, configured to perform the adjusting step of adjusting the first value of the at least one target parameter according to a target adjustment value to obtain a second value of the at least one target parameter; a generation module, configured to perform a generating step of generating a third face image in the virtual scene according to the second value of the at least one target parameter; and a first acquisition module, configured to perform an acquiring step of extracting a third image feature from the third face image, acquiring a similarity between the at least one first image feature and the at least one third image feature, taking the second value of the at least one target parameter as the first value of the at least one target parameter, and returning to the determining step.

Optionally, the first acquisition component 10 comprises: a second acquisition module, configured to acquire an original face image in the real scene; a first processing module, configured to pre-process the original face image according to a reference face image in the virtual scene to obtain the first face image, wherein the first face image corresponds to at least one first target parameter of the reference face image, and the at least one first target parameter is a part of the at least one target parameter and comprises at least one of the followings: sizes of facial features and positions of facial features.

Optionally, the first acquisition component 10 comprises: a first setting module, configured to set, before the original face image is adjusted according to the reference face image in the virtual scene to obtain the first face image, a value of at least one first type parameter comprised in the at least one target parameter to a third value, wherein the at least one first type parameter is used for indicating a shape of the target face image; a first encoding module, configured to perform one-hot encoding on a value of a at least one second type parameter comprised in the at least one target parameter to obtain an encoded value, wherein the at least one second type parameter is used for indicating a style of the target face image; and a generation module, configured to generate the reference face image according to the third value and the encoded value.

Optionally, this embodiment further comprises: an initialization component, configured to initialize, before a first face image is acquired in a real scene and a second face image in a virtual scene, the at least one target parameter to obtain the first value of the at least one target parameter.

Optionally, the initialization component comprises: a second setting module, configured to set a value of a at least one first type parameter comprised in the at least one target parameter to a third value, wherein the at least one first type parameter is used for indicating a shape of the target face image; a second encoding module, configured to perform one-hot encoding on a value of a at least one second type parameter comprised in the at least one target parameter to obtain an encoded value, wherein the at least one second type parameter is used for indicating a style of the target face image; and a determination module, configured to determine the third value and the encoded value as the first value of the at least one target parameter.

Optionally, the first acquisition component 10 comprises: a second processing module, configured to process the first value of the at least one target parameter according to a first target model to obtain the second face image, wherein the first target model is obtained according to training a first sub-target model through a at least one historical face image generated in the virtual scene and a value of target parameter for generating the at least one historical face image.

Optionally, the apparatus further includes: a processing component, configured to process, after adjusting the first value of the at least one target parameter based on the similarity to obtain a target value of the at least one target parameter, the target value of the at least one target parameter according to a first target model to obtain a fourth face image.

Optionally, the extraction component 20 includes: a third processing module, configured to process the first face image according to a second target model to obtain the at least one first image feature, and process the second face image according to the second target model to obtain the at least one second image feature, wherein the second target model is obtained according to training a second sub-target model through a at least one historical face image generated in the virtual scene and an image feature of the at least one historical face image.

Optionally, the first face image, the second face image and the target face image are three-dimensional face images.

Optionally, in this embodiment, the value of the at least one target parameter is adjusted until the value of the at least one target parameter is adjusted to the target value, so that the similarity between the target face image determined according to the target value of the at least one target parameter and the first face image is greater than or equal to the target threshold, which achieves the purpose of converting the input face image in the real scene into the face image in the virtual scene, avoids the result of similar overall color, improves the technical effect of the truth of transforming the input face image into the face image in the virtual scene, and solves the technical problem of low-level simulation in transformation from the input face image to the face image in the virtual scene.

An embodiment of the present disclosure also provides a storage medium. The storage medium stores a computer program, wherein the computer program is configured to perform the steps in any one of the above method embodiments during running.

Figure 7:
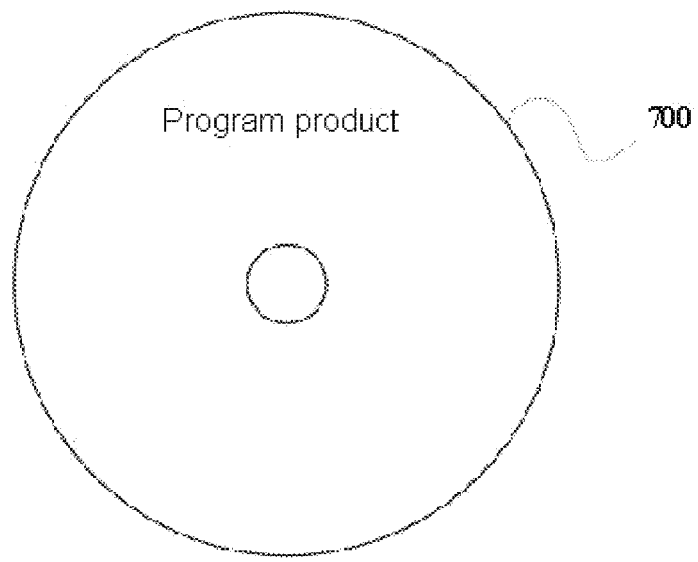
FIG. 7 is a structural schematic diagram of a non-transitory storage medium according to an embodiment of the present disclosure.

FIG. 7 is a structural schematic diagram of a non-transitory storage medium according to an embodiment of the present disclosure. As shown in FIG. 7, a program product 700 according to an implementation manner of the present disclosure is described. A computer program is stored thereon. In response to being executed according to a processor, the computer program has a program code implementing the following steps:

a first face image in a real scene and a second face image in a virtual scene are acquired, wherein the second face image is generated at least according to a first value of at least one target parameter, and the at least one target parameter is used for determining at least one attribute of a face image in the virtual scene;

at least one first image feature is extracted from the first face image, and at least one second image feature is extracted from the second face image;

a similarity between the at least one first image feature and the at least one second image feature is acquired;

the first value of the at least one target parameter is adjusted based on the similarity to obtain a target value of the at least one target parameter, wherein the target value of the at least one target parameter is used for determining a target face image to be generated in the virtual scene, and a similarity between the target face image and the first face image is greater than or equal to a target threshold; and the at least one target parameter is rendered according to the target value to obtain a target face image in the virtual scene.

Optionally, the computer program is further configured to be run to perform the following method: a determining step of determining whether the similarity is smaller than the target threshold, in response to that the similarity is smaller than the target threshold and a number of adjustments for the at least one target parameter is smaller than a target number, performing an adjusting step, and in response to that the similarity is greater than or equal to the target threshold, or a number of adjustments for the at least one target parameter is equal to a target number, determining the first value of the at least one target parameter as a target value of the at least one target parameter; the adjusting step of adjusting the first value of the at least one target parameter according to a target adjustment value to obtain a second value of the at least one target parameter; a generating step of generating a third face image in the virtual scene according to the second value of the at least one target parameter; and an acquiring step of extracting a third image feature from the third face image, acquiring a similarity between the at least one first image feature and the at least one third image feature, taking the second value of the at least one target parameter as the first value of the at least one target parameter, and returning to the determining step.

Optionally, the computer program is further configured to be run to perform the following method: an original face image in the real scene is acquired; and the original face image is pre-processed according to a reference face image in the virtual scene to obtain the first face image, wherein the first face image corresponds to at least one first target parameter of the reference face image, and the at least one first target parameter is a part of the at least one target parameter and comprises at least one of the following: sizes of facial features and positions of facial features.

Optionally, the computer program is further configured to be run to perform the following method: before the original face image is adjusted according to the reference face image in the virtual scene to obtain the first face image, a value of a at least one first type parameter comprised in the at least one target parameter is set to a third value, wherein the at least one first type parameter is used for indicating a shape of the target face image; one-hot encoding is performed on a value of a at least one second type parameter comprised in the at least one target parameter to obtain an encoded value, wherein the at least one second type parameter is used for indicating a style of the target face image; and the reference face image is generated according to the third value and the encoded value.

Optionally, the computer program is further configured to be run to perform the following method: before a first face image in a real scene is acquired and a second face image in a virtual scene is acquired, the at least one target parameter is initialized to obtain the first value of the at least one target parameter.

Optionally, the computer program is further configured to be run to perform the following method: a value of a at least one first type parameter comprised in the at least one target parameter is set to a third value, wherein the at least one first type parameter is used for indicating a shape of the target face image; one-hot encoding is performed on at least one second type parameter comprised in the at least one target parameter to obtain an encoded value, wherein the at least one second type parameter is used for indicating a style of the target face image; and the third value and the encoded value are determined as the first value of the at least one target parameter.

Optionally, the computer program is further configured to be run to perform the following method: the first value of the at least one target parameter is processed according to a first target model to obtain the second face image, wherein the first target model is obtained according to training a first sub-target model through a at least one historical face image generated in the virtual scene and a value of target parameter for generating the at least one historical face image.

Optionally, the computer program is further configured to be run to perform the following method: the first face image is processed according to a second target model to obtain the at least one first image feature, and the second face image is processed according to the second target model to obtain the at least one second image feature, wherein the second target model is obtained according to training a second sub-target model through a at least one historical face image generated in the virtual scene and an image feature of the at least one historical face image.

Optionally, in the present embodiment, the storage medium may include, but is not limited to, various media capable of storing a computer program such as a U disk, a Read-Only Memory (ROM), a Random Access Memory (RAM), a mobile hard disk, a magnetic disk or an optical disc.

An embodiment of the present disclosure also provides an electronic device, which includes a memory and a processor. The memory stores a computer program. The processor is configured to run the computer program to perform the steps in any one of the above method embodiments.

Figure 8:
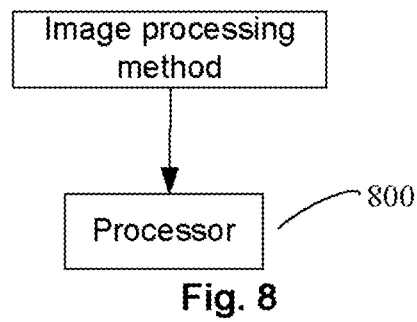
FIG. 8 is a structural schematic diagram of a processor according to an embodiment of the present disclosure.

FIG. 8 is a structural schematic diagram of a processor according to an embodiment of the present disclosure. As shown in FIG. 8, the processor 800 is configured to run a program, wherein the program is run to perform the above image processing method.

The processor may be configured to perform the following steps:

a first face image in a real scene and a second face image in a virtual scene are acquired, wherein the second face image is generated at least according to a first value of at least one target parameter, and the at least one target parameter is used for determining at least one attribute of a face image in the virtual scene;

at least one first image feature is extracted from the first face image, and at least one second image feature is extracted from the second face image;

a similarity between the at least one first image feature and the at least one second image feature is acquired;

the first value of the at least one target parameter is adjusted based on the similarity to obtain a target value of the at least one target parameter, wherein the target value of the at least one target parameter is used for determining a target face image to be generated in the virtual scene, and a similarity between the target face image and the first face image is greater than or equal to a target threshold; and the at least one target parameter is rendered according to the target value to obtain a target face image in the virtual scene.

Optionally, the processor may also be configured to perform the following steps: a determining step of determining whether the similarity is smaller than the target threshold, if it is determined that the similarity is smaller than the target threshold and the number of adjustments for target parameter is smaller than a target number, performing an adjusting step, and if it is determined that the similarity is greater than or equal to the target threshold, or the number of adjustments is equal to the target number, determining the first value of the at least one target parameter as a target value of the at least one target parameter; the adjusting step of adjusting the first value of the at least one target parameter according to a target adjustment value to obtain a second value of the at least one target parameter; a generating step of generating a third face image in the virtual scene according to the second value of the at least one target parameter; and an acquiring step of extracting a third image feature from the third face image, acquiring a similarity between the at least one first image feature and the at least one third image feature, taking the second value of the at least one target parameter as the first value of the at least one target parameter, and returning to the determining step.

Optionally, the processor may also be configured to perform the following steps: an original face image in the real scene is acquired; and the original face image is pre-processed according to a reference face image in the virtual scene to obtain the first face image, wherein the first face image corresponds to at least one first target parameter of the reference face image, and the at least one first target parameter is a part of the at least one target parameter and comprises at least one of the followings: sizes of facial features and positions of facial features.

Optionally, the processor may also be configured to perform the following steps: before the original face image is adjusted according to the reference face image in the virtual scene to obtain the first face image, a value of a at least one first type parameter comprised in the at least one target parameter is set to a third value, wherein the at least one first type parameter is used for indicating a shape of the target face image; one-hot encoding is performed on a value of a at least one second type parameter comprised in the at least one target parameter to obtain an encoded value, wherein the at least one second type parameter is used for indicating a style of the target face image; and the reference face image is generated according to the third value and the encoded value.

Optionally, the processor may also be configured to perform the following steps: before a first face image in a real scene is acquired and a second face image in a virtual scene is acquired, the at least one target parameter is initialized to obtain the first value of the at least one target parameter.

Optionally, the electronic device may further include a transmission device and an input/output device, wherein the transmission device is connected to the processor, and the input/output device is connected to the processor.

Obviously, those skilled in the art should understand that the above-mentioned modules or steps of the present disclosure may be implemented by a general-purpose computing device, and they may be centralized on a single computing device or distributed on a network composed of multiple computing devices. Optionally, they may be implemented with program codes executable by a computing device, so that they may be stored in a storage device and executed by the computing device, and in some cases, the steps shown or described may be performed in a different order than here, or they are separately made into individual integrated circuit modules, or multiple modules or steps therein are made into a single integrated circuit module for implementation. As such, the present disclosure is not limited to any particular combination of hardware and software.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure shall fall within the scope of protection of the present disclosure.

What is claimed is:

1. An image processing method, comprising:
acquiring a first face image in a real scene and a second face image in a virtual scene, wherein the second face image is generated at least according to a first value of at least one target parameter, and the at least one target parameter is used for determining at least one attribute of a face image in the virtual scene;
extracting at least one first image feature from the first face image, and extracting at least one second image feature from the second face image;
acquiring a similarity between the at least one first image feature and the at least one second image feature;
adjusting the first value of the at least one target parameter based on the similarity to obtain a target value of the at least one target parameter, wherein the target value is used for determining a target face image to be generated in the virtual scene, and a similarity between the target face image and the first face image is greater than or equal to a target threshold; and
rendering the at least one target parameter according to the target value to obtain the target face image in the virtual scene;
wherein acquiring the first face image in the real scene comprises: acquiring an original face image in the real scene; and preprocessing the original face image according to a reference face image in the virtual scene to obtain the first face image, wherein the first face image corresponds to at least one first target parameter of the reference face image, the at least one first target parameter is a part of the at least one target parameter and comprises at least one of the followings: sizes of facial features and positions of facial features.

2. The method as claimed in claim 1, wherein adjusting the first value of the at least one target parameter based on the similarity to obtain the target value of the at least one target comprises:
a determining step, determining whether the similarity is smaller than the target threshold, when determining that the similarity is smaller than the target threshold and a number of adjustments for the at least one target parameter is smaller than a target number, performing an adjusting step, and when determining that the similarity is greater than or equal to the target threshold, or a number of adjustments for the at least one target parameter is equal to a target number, determining the first value of the at least one target parameter as the target value of the at least one target parameter;
the adjusting step, adjusting the first value of the at least one target parameter according to a target adjustment value to obtain a second value of the at least one target parameter;
a generating step, generating a third face image in the virtual scene according to the second value of the at least one target parameter; and
an acquiring step, extracting at least one third image feature from the third face image, acquiring a similarity between the at least one first image feature and the at least one third image feature, taking the second value of the at least one target parameter as the first value of the at least one target parameter, and returning to the determining step.

3. The method as claimed in claim 2, wherein in the generating step, generating the third face image in the virtual scene according to the second value of the at least one target parameter comprises:
inputting the second value of the at least one target parameter into a pre-trained generation model to obtain the third face image.

4. The method as claimed in claim 2, wherein in the acquiring step, acquiring the similarity between the at least one first image feature and the at least one third image feature comprises:
acquiring the similarity between the at least one first image feature and the at least one third image feature represented by a loss function, wherein the similarity between the at least one first image feature and the at least one third image feature is used for indicating a degree of similarity in content between the first face image and the third face image.

5. The method as claimed in claim 1, wherein before preprocessing the original face image by the reference face image in the virtual scene to obtain the first face image, the method further comprises:
setting a value of at least one first type parameter comprised in the at least one target parameter to a third value, wherein the at least one first type parameter is used for indicating a shape of the target face image;
performing one-hot encoding on at least one second type parameter comprised in the at least one target parameter to obtain an encoded value, wherein the at least one second type parameter is used for indicating a style of the target face image; and
generating the reference face image according to the third value and the encoded value.

6. The method as claimed in claim 5, wherein the at least one first type parameter is continuous parameters portion of the at least one target parameter for controlling a three-dimensional shape of the target face image.

7. The method as claimed in claim 5, wherein the at least one second type parameter is discrete parameters portion of the at least one target parameter for indicating a mutually independent appearance style of the target face image.

8. The method as claimed in claim 1, wherein before acquiring the first face image in the real scene and the second face image in the virtual scene, the method further comprises:
initializing the at least one target parameter to obtain the first value of the at least one target parameter.

9. The method as claimed in claim 8, wherein initializing the at least one target parameter to obtain the first value of the at least one target parameter comprises:
setting a value of at least one first type parameter comprised in the at least one target parameter to a third value, wherein the at least one first type parameter is used for indicating a shape of the target face image;

performing one-hot encoding on at least one second type parameter comprised in the at least one target parameter to obtain an encoded value, wherein the at least one second type parameter is used for indicating a style of the target face image; and determining the third value and the encoded value as the first value of the at least one target parameter.

10. The method as claimed in claim 9, wherein the second face image generated according to the first value of the at least one target parameter is the same as the reference face image in the virtual scene.

11. The method as claimed in claim 1, wherein acquiring the second face image in the virtual scene comprises:

processing the first value of the at least one target parameter by a first target model to obtain the second face image, wherein the first target model is obtained according to training a first sub-target model through at least one historical face image generated in the virtual scene and a value of the at least one target parameter for generating the at least one historical face image.

12. The method as claimed in claim 11, wherein the first sub-target model is a deep convolutional neural network composed of a deconvolution layer.

13. The method as claimed in claim 11, wherein the at least one historical face image is a face image obtained by rendering the at least one target parameter randomly generated in each dimension.

14. The method as claimed in claim 1, wherein extracting at least one first image feature from the first face image, and extracting at least one second image feature from the second face image comprises:

processing the first face image by a second target model to obtain the at least one first image feature, and processing the second face image according to the second target model to obtain the at least one second image feature, wherein the second target model is obtained according to training a second sub-target model through at least one historical face image generated in the virtual scene and at least one image feature of the at least one historical face image.

15. The method as claimed in claim 14, wherein the second sub-target model is a deep residual network.

16. The method as claimed in claim 1, wherein the first face image, the second face image and the target face image are three-dimensional face images.

17. The method as claimed in claim 1, wherein preprocessing the original face image according to the reference face image in the virtual scene to obtain the first face image comprises:

extracting a plurality of facial key points from the reference face image and the original face image respectively, to obtain two groups of facial landmarks;

determining an affine matrix from the two groups of facial landmarks; and transforming the original face image into the first face image according to the affine matrix, wherein the first face image corresponds to the reference face image in sizes and positions of facial features.

18. A non-transitory storage medium, storing a computer program, wherein the computer program is run to perform the following method:

acquiring a first face image in a real scene and a second face image in a virtual scene, wherein the second face image is generated at least according to a first value of at least one target parameter, and the at least one target parameter is used for determining at least one attribute of a face image in the virtual scene;

extracting at least one first image feature from the first face image, and extracting at least one second image feature from the second face image;

acquiring a similarity between the at least one first image feature and the at least one second image feature;

adjusting the first value of the at least one target parameter based on the similarity to obtain a target value of the at least one target parameter, wherein the target value is used for determining a target face image to be generated in the virtual scene, and a similarity between the target face image and the first face image is greater than or equal to a target threshold; and rendering the at least one target parameter according to the target value to obtain the target face image in the virtual scene;

wherein acquiring the first face image in the real scene comprises: acquiring an original face image in the real scene; and preprocessing the original face image according to a reference face image in the virtual scene to obtain the first face image, wherein the first face image corresponds to at least one first target parameter of the reference face image, the at least one first target parameter is a part of the at least one target parameter and comprises at least one of the followings: sizes of facial features and positions of facial features.

19. An electronic device, comprising a memory and a processor, wherein the memory stores a computer program, and the processor is configured to run the computer program to perform the following method:

acquiring a first face image in a real scene and a second face image in a virtual scene, wherein the second face image is generated at least according to a first value of at least one target parameter, and the at least one target parameter is used for determining at least one attribute of a face image in the virtual scene;

extracting at least one first image feature from the first face image, and extracting at least one second image feature from the second face image;

acquiring a similarity between the at least one first image feature and the at least one second image feature;

adjusting the first value of the at least one target parameter based on the similarity to obtain a target value of the at least one target parameter, wherein the target value is used for determining a target face image to be generated in the virtual scene, and a similarity between the target face image and the first face image is greater than or equal to a target threshold; and rendering the at least one target parameter according to the target value to obtain the target face image in the virtual scene;

wherein acquiring the first face image in the real scene comprises: acquiring an original face image in the real scene; and preprocessing the original face image according to a reference face image in the virtual scene to obtain the first face image, wherein the first face image corresponds to at least one first target parameter of the reference face image, the at least one first target parameter is a part of the at least one target parameter and comprises at least one of the followings: sizes of facial features and positions of facial features.

* * * * *